United States Patent
Basketfield (10) Patent No.: US 6,691,853 B1
(45) Date of Patent: Feb. 17, 2004

(54) BOTTOM DISCHARGE SLIDE GATE (75) Inventor: John Basketfield, Birmingham (GB)

(73) Assignee: Meyer Industries, Inc., San Antonio, TX (US)

( * ) Notice: Subject to any disclaimer, the term of this patent is extended or adjusted under 35 U.S.C. 154(b) by 51 days.

(21) Appl. No.: 10/074,603

(22) Filed: Feb. 12, 2002

Related U.S. Application Data (60) Provisional application No. 60/268,456, filed on Feb. 13, 2001.

(51) Int. Cl.[7] .............................................. B65G 47/10
(52) U.S. Cl. ..................................... 198/360; 198/860.4
(58) Field of Search ................................. 198/359, 360, 198/370.01, 735.4, 771, 860.4

(56) References Cited

U.S. PATENT DOCUMENTS

| | | | | | |
|---|---|---|---|---|---|
| 2,776,741 | A | * | 1/1957 | Carrier | 198/359 |
| 4,023,673 | A | * | 5/1977 | Hansen | 198/735.4 |
| 5,183,143 | A | * | 2/1993 | Sullivan, Jr. | 198/359 |
| 5,555,967 | A | * | 9/1996 | Hufford | 198/771 |

* cited by examiner

*Primary Examiner*—Joseph E. Valenza
(74) *Attorney, Agent, or Firm*—Finnegan, Henderson, Farabow, Garrett & Dunner LLP (57) ABSTRACT

A bottom discharge slide gate apparatus for a conveyor. The slide gate apparatus may be selectively opened or closed, and may be pivoted downward away from the conveyor trough for cleaning thereof. The apparatus may be part of a vibratory conveyor system or retrofitted on an existing conveyor trough.

15 Claims, 6 Drawing Sheets

BOTTOM DISCHARGE SLIDE GATE

The present application claims the benefit of and priority to U.S. application Ser. No. 60/268,456 entitled Bottom Discharge Slide Gate, filed Feb. 13, 2001.

FIELD OF THE INVENTION

The present invention relates generally to conveyor systems. More particularly, the present invention relates to a slide gate for vibratory conveyors which selectively permits discharge of bulk material from the conveyer or allows such material to continue on its path along the conveyor or onto another conveyor in-line with the prior conveyor.

BACKGROUND OF THE INVENTION

Vibratory conveyors typically comprise a vibrating trough or pan for moving bulk material, such as food products, from an upstream location to a downstream location. The trough is typically supported from above or below the trough and vibrated by various mechanisms. The bulk material is selectively discharged at locations along the trough through passages in the bottom of the trough, which are selectively opened or closed by means of a gate. However, prior conveyor gate assemblies may be difficult to clean, particularly the gate support or part of the gate that is covered by the trough or pan.

SUMMARY OF THE INVENTION

Accordingly, the present invention provides a bottom discharge slide gate for a conveyor which may be readily cleaned by pivoting the gate away from the conveyor trough.

A preferred embodiment of the invention comprises a conveyor apparatus having a bottom discharge slide gate associated with one or more discharge passages in the conveyor trough. A gate arm assembly activates a gate between an open and closed position. During operation of the conveyor, the gate is supported by a pair of gate support panel assemblies. During cleaning operations, one of the gate support panel assemblies is released to allow the gate and gate arm assembly to pivot downward away from the conveyor trough. A preferred embodiment of the invention thus includes a bottom discharge slide gate, conveyor systems incorporating a bottom discharge slide gate, methods for cleaning a conveyor incorporating a bottom discharge slide gate, and methods for retrofitting prior conveyor systems to incorporate a bottom discharge slide gate.

DETAILED DESCRIPTION OF THE PREFERRED EMBODIMENT

Figure 1:
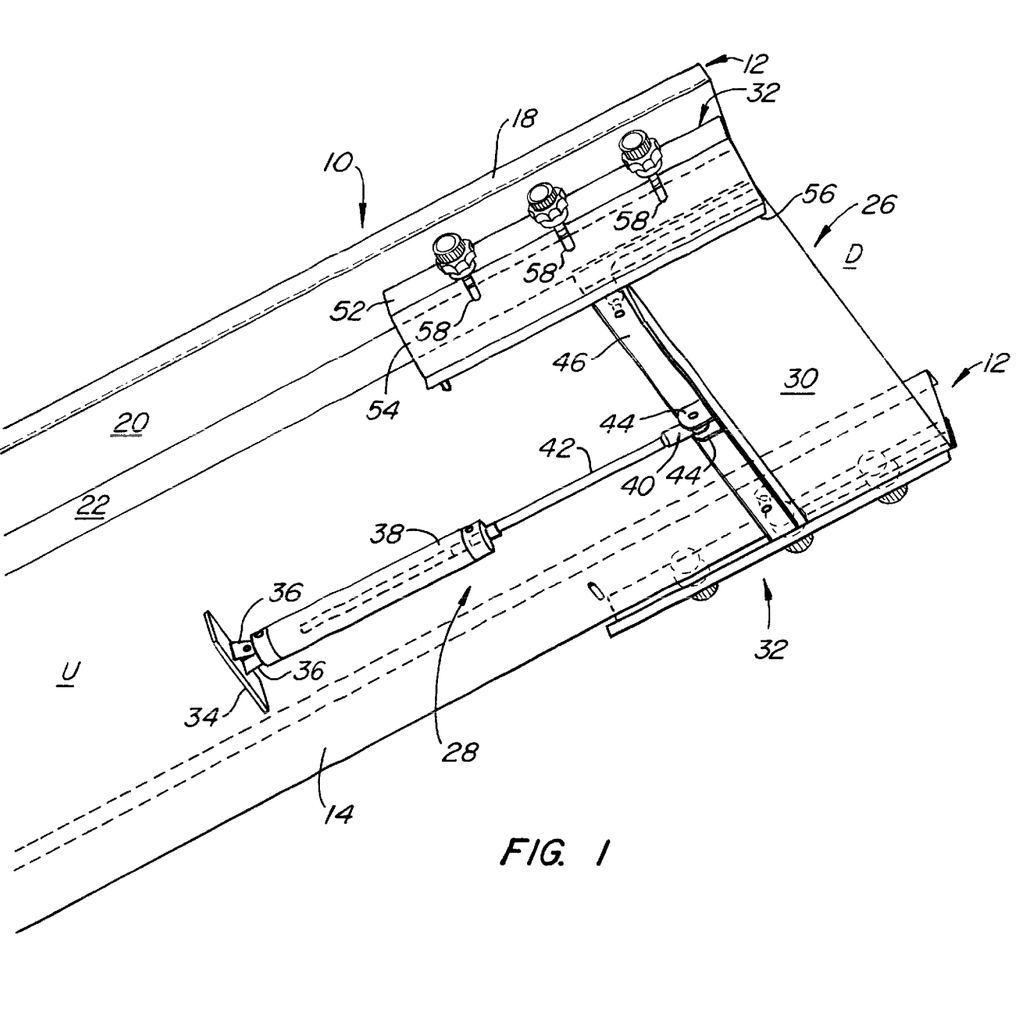
FIG. 1 is an underside perspective view illustrating a preferred embodiment of the slide gate of the present invention connected to a conveyor trough.
Figure 2:
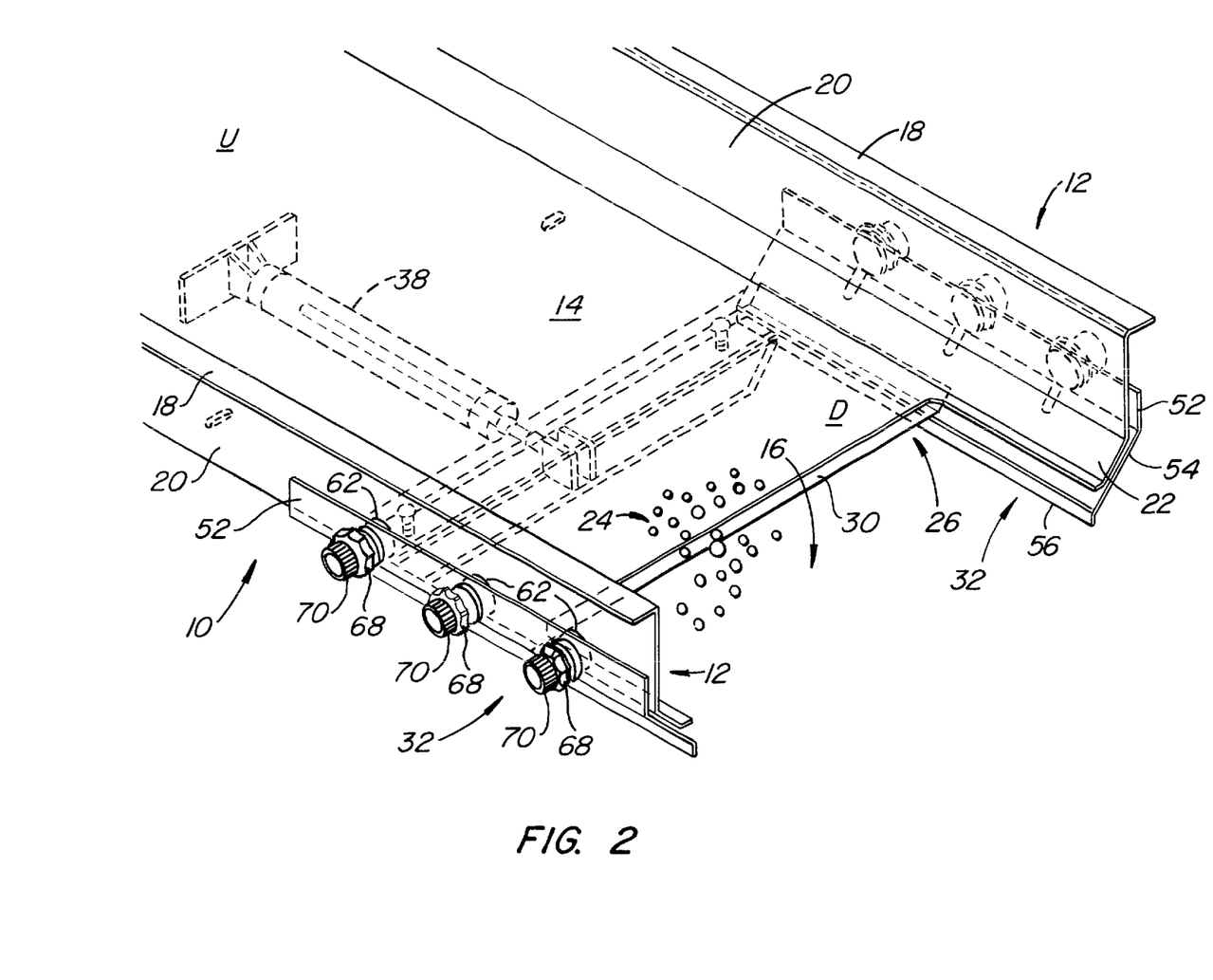
FIG. 2 is a top perspective view of a conveyor trough with a preferred embodiment of the discharge slide gate of the present invention shown in the open position.

Referring to FIGS. 1 and 2, a vibratory conveyor pan or trough is identified by the number 10. The trough 10 comprises opposing sidewalls 12 and a bottom 14, having one or more passages 16 therethrough. Each side wall 12 has a lip 18, an upper side wall portion 20 and a lower side wall portion 22 at approximately a forty-five degree (45°) angle to upper side wall portion 20 and bottom 14. Trough 10 is supported in a conventional manner and may likewise be vibrated in a conventional manner by various types of drive mechanisms. Further, trough 10 is adapted to transport products or bulk material 24 from an upstream location U to a downstream location D upon vibration of the trough 10.

Referring again to FIGS. 1 and 2, the bottom discharge slide gate assembly of the present invention is identified by the number 26. The discharge gate assembly 26 comprises a gate arm assembly 28, gate 30 and a pair of gate support panel assemblies 32.

Gate arm assembly 28 comprises a plate 34 which is welded to the underside of bottom 14, or welded to one or more other plates 35 (FIG. 5) which are welded to bottom 14, upstream from the discharge opening 16. Two pivot brackets 36 are welded to plate 34 and a rear pivot mounting pneumatic cylinder 38 is bolted to the pivot brackets 36 with a shoulder bolt (not shown). A rod end bearing 40 is screwed onto the shaft 42 of cylinder 38. Bearing 40 is bolted with a shoulder bolt (not shown) to pivot brackets 44 which are welded to a steel angle 46. Pivot brackets 44 are welded to angle 46 at a location such that when the slide gate 30 is flush against the underside of trough 10 and the centerline of the gate assembly 26 is collinear with the centerline of the trough 10, brackets 44 are in line with cylinder 38.

Referring again to FIGS. 1, 3 and 5, gate 30 is preferably machined from plastic with a forty five-degree (45°) chamfer on each side edge thereof, as identified by 30a and 30b. Gate 30 is bolted to angle 46 and angle 46 extends substantially across the full width of the upstream end of gate 30. Gate 30 is actuated between open and closed configurations by cylinder 38.

Figure 3:
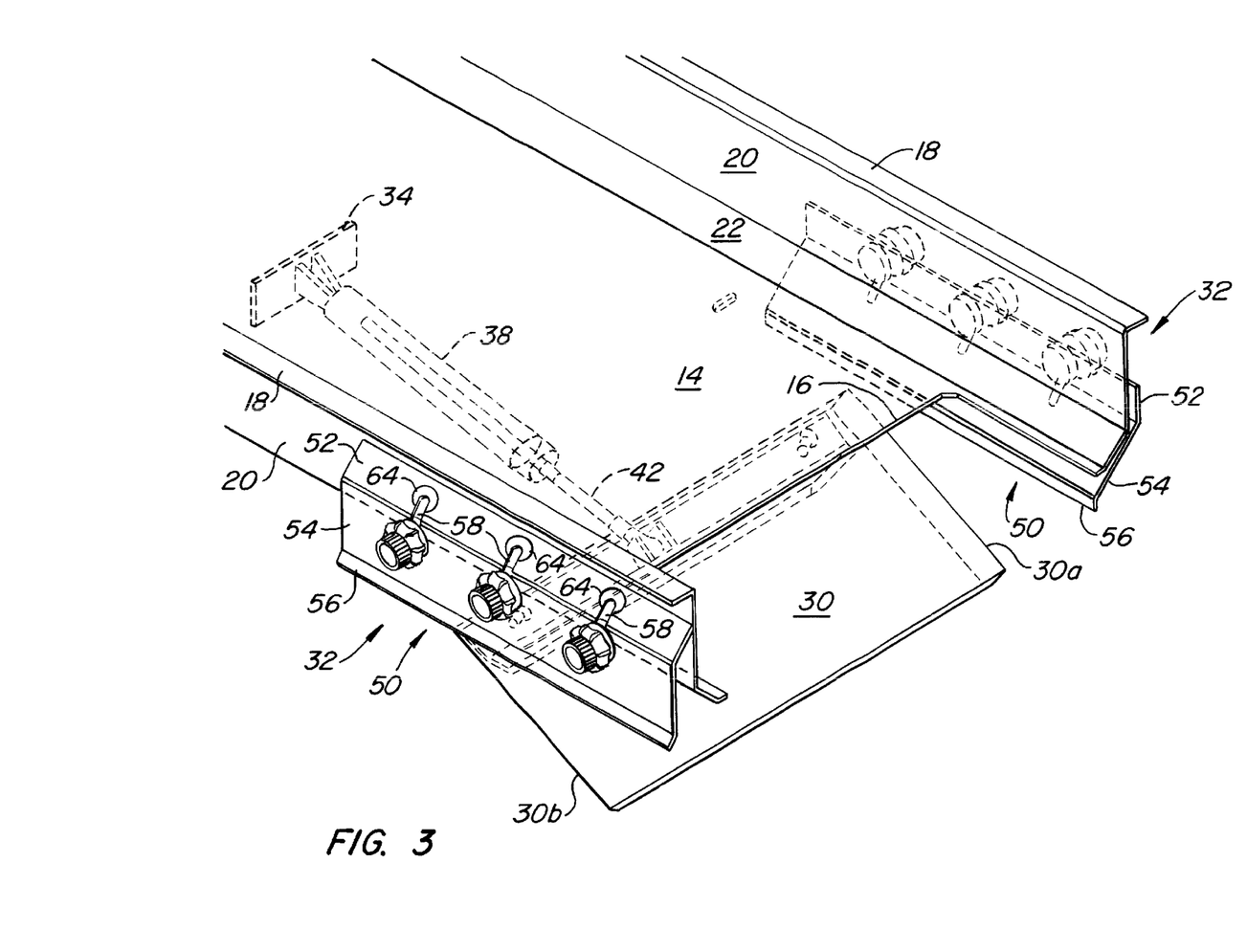
FIG. 3 is a top perspective view of a conveyor trough illustrating a preferred embodiment of the discharge gate of the present invention released for cleaning.
Figure 4:
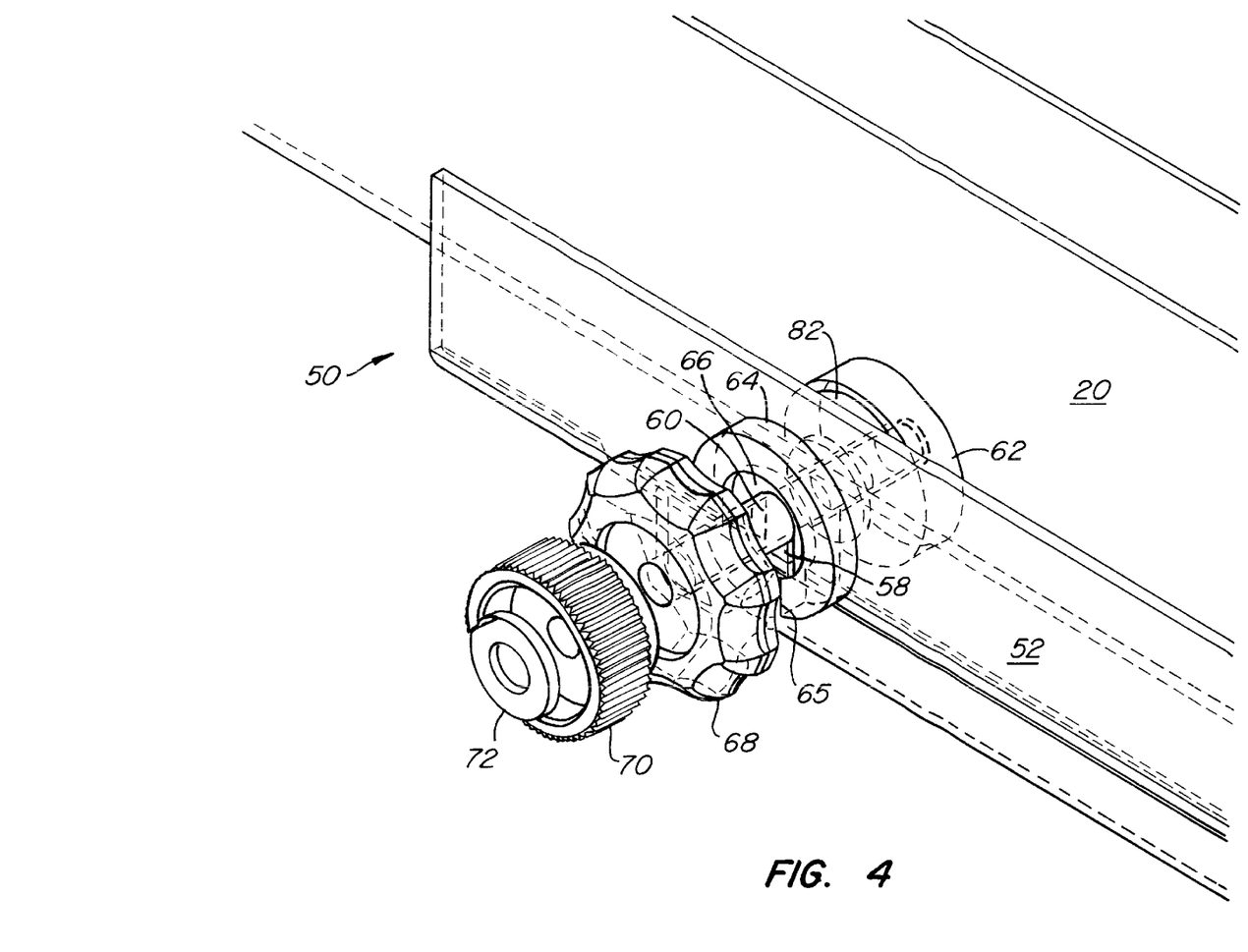
FIG. 4 is an exploded view of a compression panel connection assembly of a preferred embodiment of the discharge gate of the present invention.

Referring to FIGS. 1, 3 and 4, the gate support panel assemblies 32 each comprise a sheet metal panel 50 having an upper portion 52, a middle portion 54, and a lower portion 56, wherein the middle portion 54 is at approximately a forty five degree (45°) angle to upper portion 52 and lower portion 56. Each panel 52 has three (3) long slots 58 cut therein which extend from upper portion 52 to middle portion 54. Threaded rods 60 extend through and are welded to a washer 62, and rods 60 extend through, and are concentric or aligned with, slots 58. A respective washer 62 is positioned about each rod 60 intermediate to panel 50 and side 20 and welded to sides 20. Slotted washers 64 are welded to the panels 50 so that the slots 65 in washers 64 align with slots 58. A depressed circle 66 is machined into washer 64 so that a first knob 68 threaded on each rod 60 seats snugly in the depression. A second knob 70 threaded on each rod 60 seats into the first knob 68 to releasably lock knob 68 in place and prevent it from coming undone. A washer 72 is welded flush to the end of each rod 60, or the threads may be altered (such as by bending), to prohibit the knobs 68 and 70 from coming off of the respective rod 60.

Figure 6:
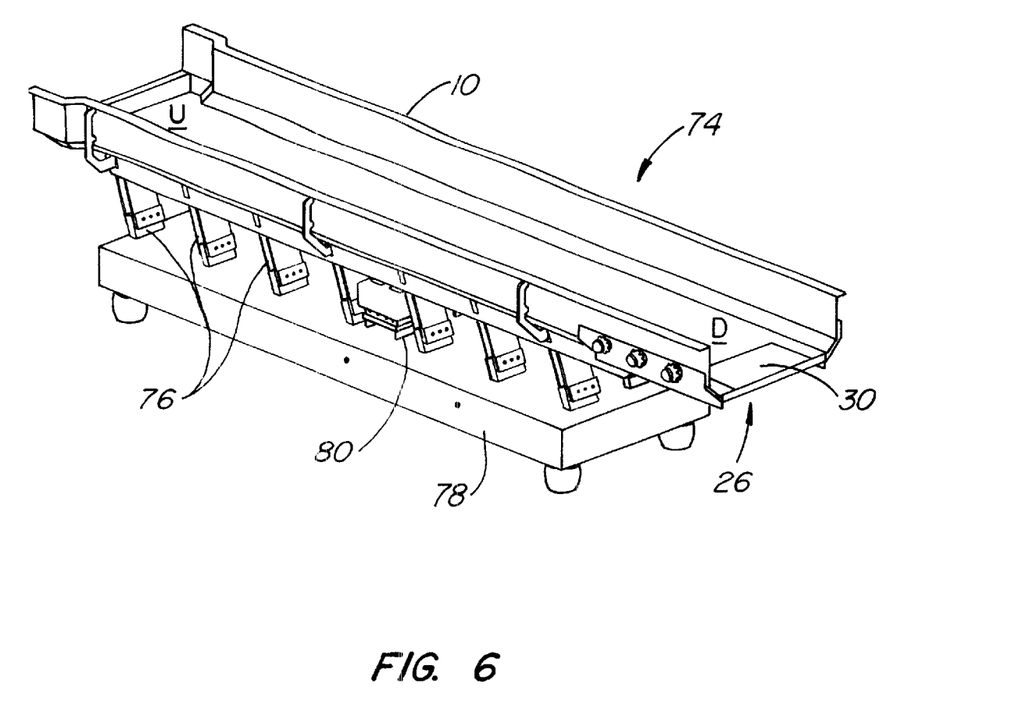
FIG. 6 is a perspective view illustrating a preferred embodiment of the bottom discharge slide gate of the present invention incorporated into a vibratory conveyor system.

Referring to FIG. 6, a vibratory conveyor system incorporating the bottom discharge slide gate of the present invention is identified by the number 74. The trough 10 is connected to and supported by a plurality of leaf springs 76 which are connected to and supported by a base 78. An electromagnetic motor 80 is mounted atop base 78 and operatively engaged with the leaf springs 76 to vibrate the leaf springs 76 and thereby impart vibratory motion to the trough 10. In one manner of usage, the system 74 may be aligned with another system 74 (not shown) so that the downstream end D of the upstream conveyor system 74 overlaps the upstream end U of a similar conveyor system. The overlapping of an upstream conveyor system 74 with a downstream conveyor system 74 by approximately one inch permits products 24 to be discharged from the upstream conveyor system 74 when the gate 30 is opened or, alternatively, passed into the trough 10 of the downstream conveyor system when gate 30 is closed.

As shown in FIG. 4, a washer 82 may be positioned about each rod 60 and welded to each washer 62. By increasing or decreasing the thickness of the washers 82, the tension between the gate 30 and trough 10 can be adjusted. In this manner, the panels 50 will apply appropriate pressure to the gate 30 and hold it on to the bottom of trough 10 to prevent rattling and make a seal between trough 10 and gate 30, while still allowing gate 30 to slide during opening and closing thereof.

It is to be understood that, although the present invention is described in connection with a vibratory conveyor system, the bottom discharge slide gate apparatus of the present invention may be used in other types of conveyors and conveyor systems that utilize discharge gates. Such conveyors may be supported in various manners, such as by overhead lines connected to the conveyor and ceiling, and designed to facilitate movement of products from an upstream end to a downstream end, such as by vibration, belts or gravity.

During usage of the slide gate assembly 26, the panels 50 are secured to sides 20 with the rods 60 extending through the portion of the slots 58 through upper panel portions 52, as illustrated in FIGS. 1 and 2. The panels 50 are releasably held in this position by the tightening of knobs 68 and 70. In this locked position, gate 30 is supported by panels 50 such that edges 30a and 30b ride in mating engagement with the angled middle portion 54 of the respective panels 50, as illustrated in FIGS. 1 and 2. Panels 50 thus provide a lip or track for supporting gate 30 and bottom 14 and portions 54 define or provide a groove or track for sliding travel of gate 30. In this configuration or operation mode, the gate arm assembly 28 is generally adjacent to or flush with the underside of the trough 10. The gate 30 is selectively moved from a "closed" to an "open" position by extension or retraction, respectively, of cylinder 38. The cylinder 38 may be remotely operated by an electric signal from a control system (not shown) to a solenoid valve (not shown) in a manner know in the art for selectively activating a pneumatic cylinder. In this manner, the passage 16 in trough 10 can by closed or blocked by gate 30, thereby allowing the transported material 24 to continue downstream, or opened to allow the material 24 to pass through opening 16 to a receptacle or other destination.

Figure 5:
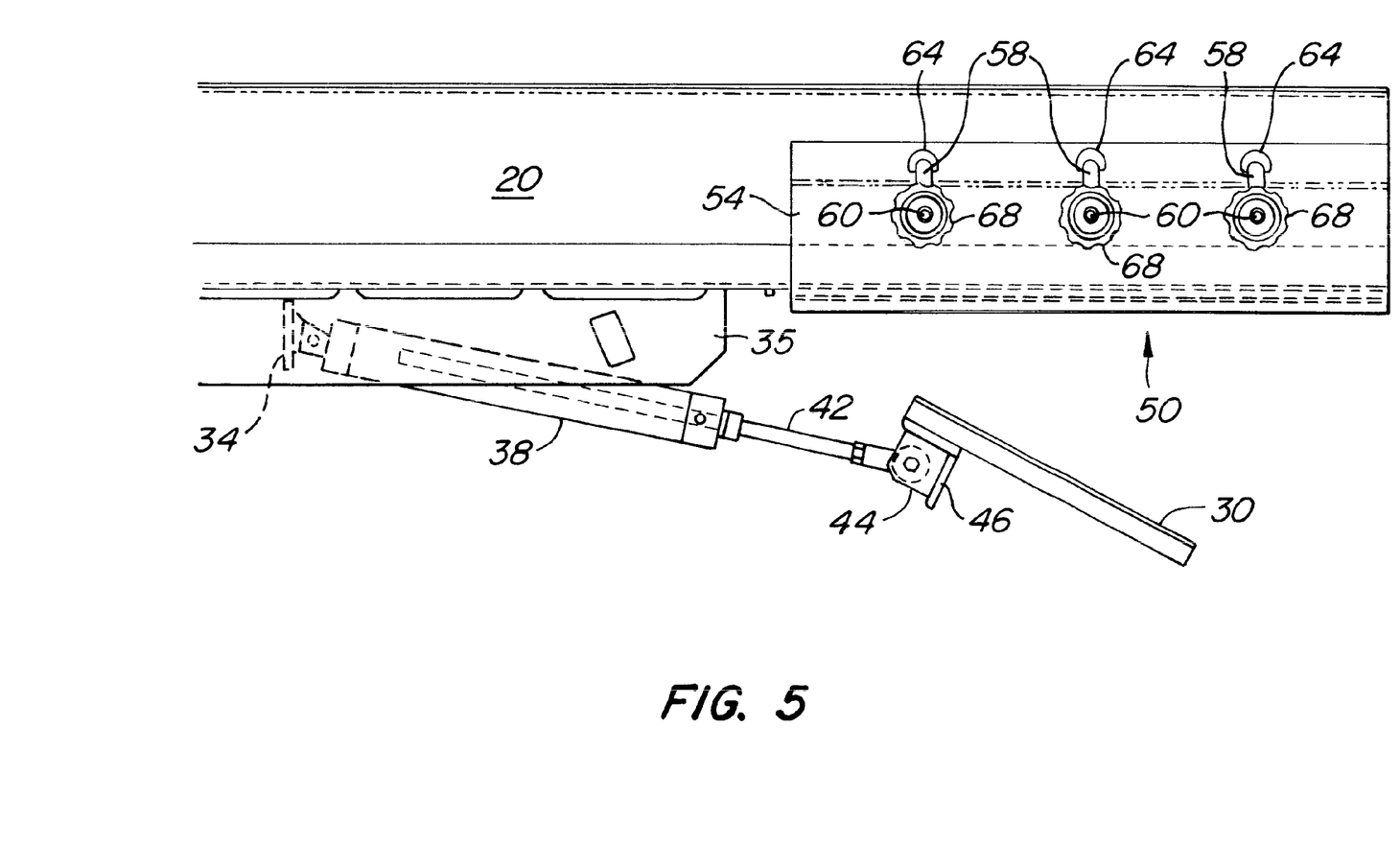
FIG. 5 is a side elevational view illustrating a preferred embodiment of the discharge gate assembly of the present invention released for cleaning.

Referring to FIGS. 3, 4 and 5, the gate assembly 26 may be readily cleaned by loosening knobs 68 and 70 of one of the pair of gate support panel assemblies 32 (shown as the left assembly 32 in FIG. 3 and FIG. 5) and moving the panel 50 outward and upward so that rods 60 extend through the portion of slots 58 through middle panel portion 54. Gate 30 is thereby released from the support of panels 50 and may be pivoted downward and away from trough bottom 14 to the cleaning mode illustrated in FIG. 3 and FIG. 5. In this disengaged configuration, gate 30, panels 50 and arm assembly 28 may thereby be readily cleaned without interference from trough 10. Once cleaned, the discharge gate assembly 26 may be readily repositioned in the operation mode or engaged configuration by pivoting gate 30 upward into mating engagement with panels 50 so that panels 50 again support gate 30, and retightening the previously loosened knobs 68 and 70.

The present invention thus comprises a bottom discharge slide gate, and a conveyor system having a bottom discharge slide gate associated with one or more passages in the conveyor trough. The bottom discharge slide gate comprises gate apparatus, including gate 30 and gate actuator 38, pivotally connected to the trough 10, and gate support panel assemblies 32 for releasably engaging gate 30. The present invention further includes methods for cleaning a conveyor by releasing the gate 30 of the bottom discharge slide gate 26 from engagement with the conveyor trough 10, pivoting the gate 30 away from the trough 10, cleaning the gate apparatus and support assemblies, and reengaging the gate 30 with the trough by pivoting the gate 30 toward the trough 10 and reengaging the gate 30 with the panel assemblies 32. Finally, the present invention includes methods of retrofitting a conveyor, having a trough with a passage therethrough, by removing the prior gate mechanism from the conveyor and attaching the bottom discharge slide gate assembly 26 of the present invention thereto.

While the bottom discharge slide gate of the present invention has been described in connection with preferred embodiments, it is not intended to limit the invention to the particular form set forth, but on the contrary, it is intended to cover such alternatives, modifications and equivalents as may be included within the spirit and scope of the invention as defined by the appended claims.

I claim:

1. A vibratory conveyor system, comprising:
    a trough adapted to move products from an upstream end to a downstream end, said trough having a bottom, first and second opposing side walls, and a passage through said bottom for permitting discharge of said products from said trough;
    a support for said trough and a motor for imparting vibratory motion to said trough;
    gate apparatus pivotally connected to an underside of said trough; and
    a first gate support panel assembly connected to said first side wall and a second gate support panel assembly connected to said second side wall, said first gate support panel assembly providing a first track for receiving a first edge of a gate of said gate apparatus and said second gate support panel assembly providing a second track for receiving a second edge of said gate, said gate apparatus being located relative to said passage to alternatively move said gate between an open configuration wherein products may be discharged through said passage and a closed configuration wherein said products are not discharged through said passage, said first and second gate support panel assemblies releasably engaging said gate to permit said gate to be pivoted away from said trough upon release of one of said gate support panel assemblies.

2. A vibratory conveyor system, as recited in claim 1, wherein said gate apparatus comprises said gate and a gate actuator, said gate actuator connected on one end thereof to said gate and pivotally connected at an opposite end thereof to said bottom of said trough.

3. A vibratory conveyor system, as recited in claim 1, wherein said first gate support panel assembly comprises a first panel and said second gate panel assembly comprises a second panel, said first panel being movably connected to said first side wall and said second panel being movably connected to said second side wall, said first panel and said second panel being movable between an engaged configuration for supporting said gate and a disengaged configuration for permitting said gate to be pivoted away from said trough.

4. A vibratory conveyor system, as recited in claim 1, wherein a portion of said first and second opposing side walls adjacent said bottom is at an angle of approximately forty-five (45) degrees relative to said bottom.

5. A vibratory conveyor system, comprising:

a trough adapted to move products from an upstream end to a downstream end, said trough having a bottom, first and second opposing side walls, and a passage through said bottom for permitting discharge of said products from said trough;

a support for said trough and a motor for imparting vibratory motion to said trough;

gate apparatus pivotally connected to an underside of said trough, wherein said gate apparatus comprises a gate and a gate actuator, said gate actuator connected on one end thereof to said gate and pivotally connected at an opposite end thereof to said bottom of said trough; and first gate support panel assembly connected to said first side wall and a second gate support panel assembly connected to said second side wall, said first gate support panel assembly providing a first track for receiving a first edge of said gate and said second gate support panel assembly providing a second track for receiving a second edge of said gate, said gate apparatus being located relative to said passage to alternatively move said gate between an open configuration wherein products may be discharged through said passage and a closed configuration wherein said products are not discharged through said passage, said first and second gate support panel assemblies releasably engaging said gate to permit said gate to be pivoted away from said trough, wherein said first gate support panel assembly comprises a first panel and said second gate panel assembly comprises a second panel, said first panel being movably connected to said first side wall and said second panel being movably connected to said second side wall, said first panel and said second panel being movable between an engaged configuration for supporting said gate and a disengaged configuration for permitting said gate to be pivoted away from said trough.

6. A discharge gate assembly for a conveyor having a trough with a passage through a bottom thereof, comprising:

gate apparatus pivotally connected to an underside of said trough; and a first gate support panel assembly connected to a first side wall of said trough and a second gate support panel assembly connected to a second side wall of said trough, said first gate support panel assembly providing a first track for receiving a first edge of a gate of said gate apparatus and said second gate support panel assembly providing a second track for receiving a second edge of said gate, said gate apparatus being located relative to said passage to alternatively move said gate between an open configuration wherein products may be discharged through said passage and a closed configuration wherein products are not discharged through said passage, said first and second gate support panel assemblies releasably engaging said gate to permit said gate to be pivoted away from said trough upon release of one of said gate support panel assemblies.

7. A discharge gate assembly, as recited in claim 6, wherein said gate apparatus comprises said gate and a gate actuator, said gate actuator connected on one end thereof to said gate and pivotally connected at an opposite end thereof to said bottom of said trough.

8. A discharge gate assembly, as recited in claim 6, wherein said first gate support panel assembly comprises a first panel and said second gate panel assembly comprises a second panel, said first panel being movably connected to said first side wall and said second panel being movably connected to said second side wall, said first panel and said second panel being movable between an engaged configuration for supporting said gate and a disengaged configuration for permitting said gate to be pivoted away from said trough.

9. A conveyor system, as recited in claim 5, wherein a portion of said first and second opposing side walls adjacent said bottom is at an angle of approximately forty-five (45) degrees relative to said bottom.

10. A discharge gate assembly for a conveyor having a trough with a passage through a bottom thereof, comprising:

gate apparatus pivotally connected to an underside of said trough, wherein said gate apparatus comprises a gate and a gate actuator, said gate actuator connected on one end thereof to a gate and pivotally connected at an opposite end thereof to said bottom of said trough; and a first gate support panel assembly connected to a first side wall of said trough and a second gate support panel assembly connected to a second side wall of said trough, said first gate support panel assembly providing a first track for receiving a first edge of said gate of said gate apparatus and said second gate support panel assembly providing a second track for receiving a second edge of said gate, said gate apparatus being located relative to said passage to alternatively move said gate between an open configuration wherein products may be discharged through said passage and a closed configuration wherein products are not discharged through said passage, said first and second gate support panel assemblies releasably engaging said gate to permit said gate to be pivoted away from said trough, wherein said first gate support panel assembly comprises a first panel and said second gate support panel assembly comprises a second panel, said first panel being movably connected to said first side wall and said second panel being movably connected to said second side wall, said first panel and said second panel being movable between an engaged configuration for supporting said gate and a disengaged configuration for permitting said gate to be pivoted away from said trough.

11. A method for cleaning a conveyor, comprising a trough having at least one passage therethrough and a gate moveable between an open configuration and a closed configuration, comprising the steps of:

releasing said gate from engagement with said trough, wherein said step of releasing said gate comprises the steps of moving a gate support panel assembly from an engaged configuration to a disengaged configuration;

pivoting said gate away from said trough;

cleaning said gate; and reengaging said gate with said trough.

12. A method for cleaning a conveyor, comprising a trough having at least one passage therethrough and a gate moveable between an open configuration and a closed configuration, comprising the steps of:

releasing said gate from engagement with said trough;

pivoting said gate away from said trough;

cleaning said gate; and reengaging said gate with said trough, wherein said step of reengaging said gate with said trough comprises the steps of pivoting said gate toward said trough and engaging said gate with a pair of gate support panel assemblies.

13. A method for cleaning a conveyor comprising a trough having at least one passage therethrough and a gate moveable between an open configuration and a closed configuration, comprising the steps of:

releasing said gate from engagement with said trough, wherein said step of releasing said gate comprises the step of moving a gate support panel assembly from an engaged configuration to a disengaged configuration;

pivoting said gate away from said trough;

cleaning said gate; and reengaging said gate with said trough, wherein said step of reengaging said gate with said trough comprises the steps of pivoting said gate toward said trough and engaging said gate with said gate support panel assembly.

14. A method for retrofitting a conveyor having a trough with a passage through a bottom thereof and a gate for alternatively opening or closing said passage, comprising the steps of:

removing said gate from said conveyor;

pivotally attaching a gate apparatus to an underside of said trough in proximity to said passage; and attaching a first gate support panel assembly to a first side wall of said trough and a second gate support panel assembly to a second side wall of said trough, said panel assemblies defining grooves for receiving said gate apparatus adjacent to said passage, wherein during said panel assembly attaching step said first gate support panel assembly is attached so as to permit movement thereof from a configuration in which said first gate support panel assembly is engaged with said gate apparatus to a configuration in which said first gate support panel assembly is disengaged from said gate apparatus.

15. A method for retrofitting a conveyor, as recited in claim 14, wherein said gate apparatus comprises a gate and a gate actuator and said step of attaching said gate apparatus to an underside of said trough comprises the step of attaching one end of said gate actuator to an underside of said trough, said gate being connected to an opposite end of said gate actuator.

\* \* \* \* \*